Figure 1:
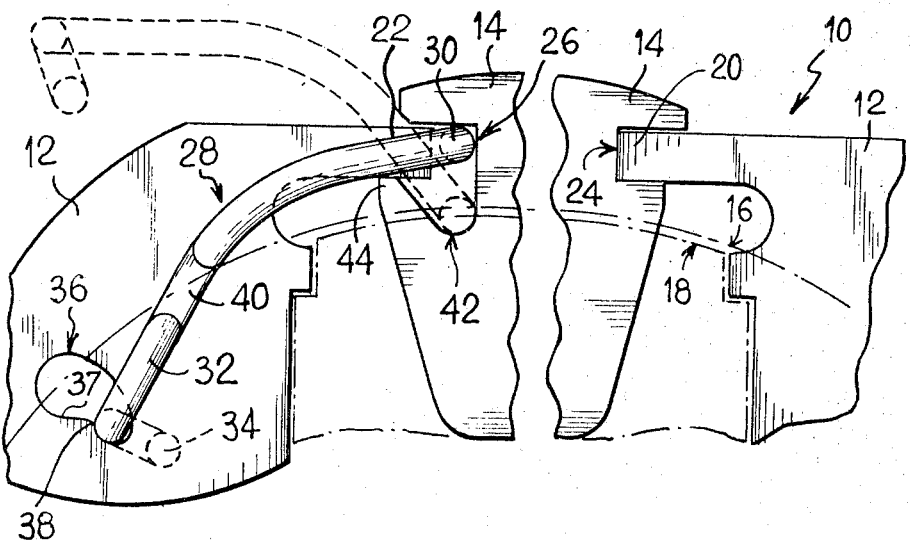

United States Patent [19]
Schoenhenz

[11] 3,838,754
[45] Oct. 1, 1974

[54] SLIDING CALIPER DISC BRAKE
[75] Inventor: Daniel Schoenhenz, Epinay, France
[73] Assignee: Societe Anonyme D.B.A., Paris, France
[22] Filed: Mar. 5, 1973
[21] Appl. No.: 337,988

[30] Foreign Application Priority Data
Mar. 2, 1972  France .............................. 72.7191

[52] U.S. Cl. ............................................ 188/73.3
[51] Int. Cl. ......................................... F16d 55/224
[58] Field of Search ........ 188/73.3, 73.5, 73.6, 72.4

[56] References Cited
UNITED STATES PATENTS
3,403,756   10/1968   Thirion .............................. 188/73.3
3,612,226   10/1971   Pauwels ............................ 188/73.3

*Primary Examiner*—Trygve M. Blix
*Assistant Examiner*—Charles E. Frankfort
*Attorney, Agent, or Firm*—Ken C. Decker; William N. Antonis

[57] ABSTRACT

A disc brake is disclosed which includes a stationary torque member and a caliper slidably mounted on the torque member. The caliper is provided with slots on opposite sides thereof which slidably receive corresponding projections extending from the torque member. One edge of one of the slots is provided with a groove, and a keyforming element includes a portion which is initially received within the groove while the caliper is installed upon the torque member, whereupon the element is moved to a position between the edge of the projection and the end of the slot to prevent removal of the caliper. The key-forming member includes a pair of resilient legs extending from the element which are received in openings within the torque member, so that the key-forming member is stressed to resiliently urge the caliper against the torque member.

5 Claims, 2 Drawing Figures

PATENTED OCT 1 1974 3,838,754

SLIDING CALIPER DISC BRAKE

The invention relates primarily to a disc brake of the type comprising a fixed support and a caliper slidably mounted on this support.

More particularly the invention relates to a brake having an improved means for guiding the sliding movement of the caliper on the fixed support.

In a prior proposal, notably in French Pat. specification No. 1 506 592, the fixed support of a brake comprises two circumferentially offset, mutually opposite edges, a caliper axially slidable between the said edges of the fixed support, and two keys inserted between the caliper and the fixed support. Also, resilient means are provided between the keys and caliper to absorb vibration during operation.

In this arrangement the keys are inserted after the caliper is positioned on the support, and are maintained against axial escape by means of clevis pins which requires a relatively long assembly time and a large number of relatively expensive components.

A principal object of the invention is to propose a device for which the assembly time and the number of components used are substantially reduced.

The disc brake of the invention has a fixed support comprising two circumferentially-spaced, radially extending arm members, and a caliper member mounted for axial sliding movement between said arm member by means of a pair of slidable joints, each including a projection formed on one of said members and received in a slot formed in the other member, a key forming element being inserted between the end of the projection and the wall of the slot in at least one of said slidable joints to prevent radial motion of the caliper member, removal of said key forming element permitting the caliper member to be radially outwardly removed from the fixed support. According to the invention, one of said joints includes a groove capable of receiving the key-forming element to keep said element out of the way during assembly of the caliper on the fixed support, locking means being provided to maintain, after said assembly, the key-forming element in a locked position in which said element is located out of the groove and between the end of the projection and the wall of the slot.

Figure 2:
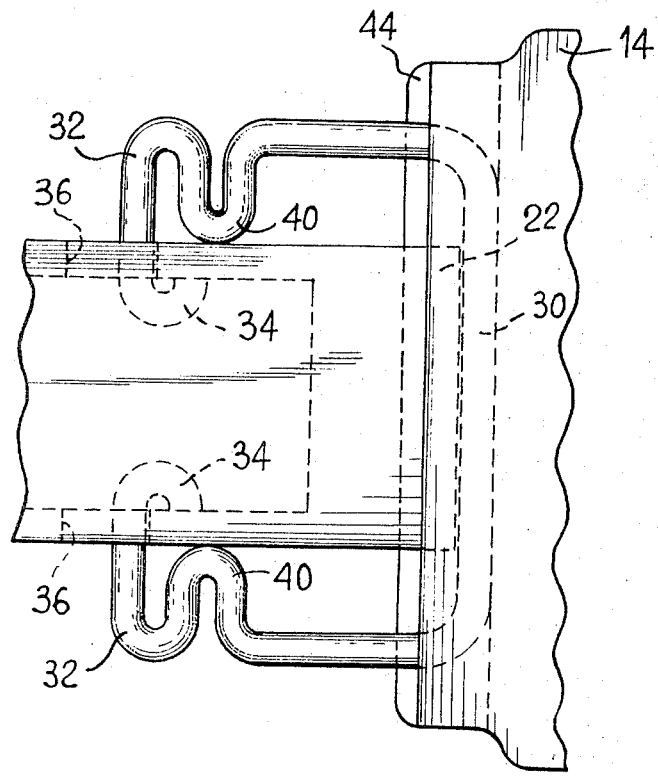

FIG. 1 illustrates part of a disc brake embodying the invention, showing the means for guiding the caliper on the fixed support; and FIG. 2 is a partial plan view illustrating the device shown in FIG. 1.

In the drawings, a brake 10 comprises a fixed support 12 and a sliding caliper 14. The caliper straddles a disc 16 shown in phantom line and is capable of applying friction pads 18, also shown in phantom line, to respective sides of the disc by way of actuating means (not shown).

The fixed support 12 includes two circumferentially offset radial arms. Two projections 20, 22 formed on each radial arm respectively, have an axially extending edge and are directed toward each other. The projections 20, 22 are received for axial sliding movement in respective slots 24, 26 provided in the caliper 14. An axial groove 42 formed in the lower surface of one of the slots 26 has an axially extending edge 44. A key-forming element 28 in the form of a substantially U-shaped spring wire has a rectilinear base 30 located between the end surface of the slot 26 and the edge of the projection 22, and two resilient legs 32 which, in the locked condition of the element 28, are tensioned by having their ends 34 anchored in openings 36 in the fixed support. Each opening 36 comprises a cam forming surface 37 and abutments 38 to keep the element 28 in the locked condition. Each leg 32 includes an inwardly bulging portion 40 which contactively engages the fixed support 12, thereby centering the key-forming element 28 relative to the fixed support 12.

The caliper 14 is assembled on the fixed support 12 as follows.

To begin with, the key-forming element 28 is placed in the groove 42 as shown in dotted lines in FIG. 1, and the caliper 14 is placed astride the disc 16 with projection 22 of the fixed support received in the slot 26 of the caliper. The element 28 being maintained in the groove 42, the caliper 14, is moved to the left of the figure until the projection 22 contactively engages the end surface of the slot 26, so as to allow the other end of the caliper to be lowered to a position in which the other projection 20 of the fixed support can be received in the other slot 24 of the caliper. The caliper is then moved to the right of the figure until the projection 20 contactively engages the end of the slot 24, as shown in FIG. 1. Then, the key-forming element 28 is brought into its operating position by bending downwardly the legs 32 and inserting the ends 34 thereof into the openings 36. In this operation the edge 44 of the groove 42 acts as a fulcrum for causing the base 30 of the element 28 to move upwardly out of the groove 42 until it is fully contained within the slot 26 and abuts the upper surface of this slot. Finally, the key-forming element 28 is locked by having the ends 34 of its legs 32 slidden over the can surfaces 37 until they have passed the abutments 38 of the openings 36.

It will be appreciated that the assembly can be carried out in a relatively short time, since no additional operations are needed for placing a key and securing this key for example by means of clevis pins. In this invention, the key-forming element 28 is kept out of the way during mounting of the caliper on the support. The key-forming element is trapped between the fixed support and the caliper during assembly and it is subsequently locked by simply anchoring its ends. The key-forming element need not be in the shape of a U as in the preferred embodiment described above and, in its simplest form, the key-forming element may consist in a rectilinear rod which can be contained in the groove during the first steps of the assembly, and which is subsequently maintained out of the groove by any known type of locking means.

In the preferred embodiment, the resiliency of the key-forming element has a vibration-damping effect. When tensioned, the legs 32 of the key-forming element 28 subject the caliper to a force having a radial component and a tangential component. The radial component, which is directed outwardly, urges the caliper into abutment with the fixed support, while the tangential component causes the slot 24 to bear on the projection 20 of the fixed support. Causing the caliper to abut radially and tangentially on the fixed support in this way prevents any relative motion of the caliper and support which might result from vibration.

Another advantage is that the construction of the key-forming element 28 as a single resilient component provides the resiliency urging the caliper on to the support without requiring any additional components.

Moreover, the cross-section of the spring wire of which the key-forming element is made is selected so as to leave between the caliper and support, in the operative position, a circumferential clearance greater than the circumferential clearance between the pressure pads and the recesses for the latter in the support. During braking, therefore, when the disc rotates anticlockwise in the figure, the caliper/pad assembly abuts on the support with a circumferential movement, the bearing surface being one edge of the pad recess. In this position there is no positive bearing action of the caliper on the fixed support, and the brake torque is therefore entirely absorbed by the fixed support.

Furthermore, this circumferential clearance overcomes a frequent disadvantage of sliding-caliper disc brakes, in which after prolonged lack of use the caliper may jam on the support due to corrosion. In a brake embodying the invention the caliper shifts slightly on the support every time the vehicle is jolted, this shift being permitted by the said clearance. The resulting continual rubbing of the mating surfaces on the caliper and support keeps these surfaces permanently clean and polished, eliminating all risk of corrosion and therefore of jamming of the caliper on the support.

I claim:

1. In a disc brake:
a fixed support member;
a caliper member;
means slidably mounting said caliper member on said fixed support member to permit transverse sliding movement of the caliper member on the fixed support member,
said slidably mounting means including a slot in said caliper member having an open side receiving a portion of the fixed support member, said slot having upper and lower edges extending above and below the portion of the fixed support member received in the open side of the slot, and a joining side opposite said open side interconnecting the upper and lower edges, a groove defined in one of said edges of said slot, and a key-forming member having an element movable from a first position wherein the element is received within said groove permitting said caliper member to be twisted to remove said portion from said slot to a second position wherein said element is disposed between said portion and said joining side to thereby lock the caliper member onto said fixed support member, said key-forming member including locking means maintaining said element in said second position until said locking means is released.

2. The invention of claim 1:
said locking means being resilient to yieldably maintain said element in said second position prior to release of the locking means.

3. The invention of claim 1:
said key-forming member being substantially U-shaped, said element comprising the base of said U-shaped key-forming member, and the legs of said U-shaped key-forming member comprising said locking means, the ends of said legs being anchored in said fixed support member.

4. The invention of claim 3:
said key-forming member being a spring wire, so that the latter is stressed to bias the caliper radially outwardly when the ends of said legs are anchored in the fixed support member.

5. The invention of claim 4:
said fixed support member having openings receiving the ends of said legs, the edges of said openings defining a camming portion for guiding the end of the corresponding leg when the key-forming member is stressed, said edges of the openings further defining an abutment to retain said corresponding leg in a position maintaining said element in said second position.

* * * * *